(12) United States Patent
Rakshit et al.

(10) Patent No.: US 10,938,826 B2
(45) Date of Patent: Mar. 2, 2021

(54) INTELLIGENT DEVICE SECURITY

(71) Applicant: International Business Machines Corporation, Armonk, NY (US)

(72) Inventors: Sarbajit K. Rakshit, Kolkata (IN); Kuntal Dey, New Delhi (IN); Pramod Vadayadiyil Raveendran, Bengaluru (IN); Sougata Mukherjea, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 91 days.

(21) Appl. No.: 16/421,565

(22) Filed: May 24, 2019

(65) Prior Publication Data

US 2020/0374292 A1   Nov. 26, 2020

(51) Int. Cl.
  *G06F 21/00*  (2013.01)
  *H04L 29/06*  (2006.01)
  (Continued)

(52) U.S. Cl.
  CPC ........ *H04L 63/102* (2013.01); *G06N 5/02* (2013.01); *H04L 63/20* (2013.01); *G06F 16/903* (2019.01)

(58) Field of Classification Search
  None
  See application file for complete search history.

(56) References Cited

U.S. PATENT DOCUMENTS

| | | | | |
|---|---|---|---|---|
| 7,644,145 | B2 * | 1/2010 | Rockwell | H04L 67/10 709/223 |
| 2014/0208395 | A1 * | 7/2014 | Tietjen | H04L 67/04 726/4 |
| 2017/0093915 | A1 * | 3/2017 | Ellis | H04W 12/08 |
| 2017/0093982 | A1 * | 3/2017 | Shaashua | H04W 4/70 |
| 2017/0250814 | A1 | 8/2017 | Brickell | |
| 2017/0311115 | A1 * | 10/2017 | Adrangi | H04W 4/80 |
| 2018/0173892 | A1 | 6/2018 | Zibuschka | |

FOREIGN PATENT DOCUMENTS

| KR | 20160121775 A | 10/2016 |
|---|---|---|
| WO | 20182337251 A1 | 12/2018 |

OTHER PUBLICATIONS

"Smart Home", Statista, The Statistics Portal, 7 pages, <https://www.statista.com/outlook/279/100/smart-home/worldwide>, (2019).

(Continued)

*Primary Examiner* — Maung T Lwin
(74) *Attorney, Agent, or Firm* — Christopher M. Pignato

(57) ABSTRACT

Systems, methods, and computer program products that automate the removal of user data, device data and learning data stored by intelligent devices operating as part of an internet-of-things network or managed by IoT platforms. The solutions reverse engineer locally stored data and communication logs maintained in the intelligent device to identify one or more intelligent devices or platforms previously placed in communication with the intelligent device being flushed. The systems, methods and computer program products automatically connect to devices and platforms previously placed in communication with the intelligent device and flush the data associated with the intelligent device or disassociate the device from a user's profile. Verification programs or simulations are run to confirm the removal of the user data, device data and learning data. Confirmation of the removal is provided to the user indicating that the intelligent device can be safely transferred to a new user or third party.

20 Claims, 6 Drawing Sheets

(51) Int. Cl.
  *G06N 5/02* (2006.01)
  *G06F 16/903* (2019.01)

(56) References Cited

OTHER PUBLICATIONS

Cox, Joseph, "The Internet of Things Can't Keep Your Data Safe", Motherboard, Jul. 31, 2014, 12:00pm, 10 pages, <https://motherboard.vice.com/en_us/article/nze78z/the-internet-of-things-has-your-personal-info>.
Nachreiner, Corey, "Smart devices, stupid mistakes—how to make sure you're really wiping all that sensitive data", GeekWire, Feb. 25, 2017 at 1:30 pm, 19 pages, <https://www.geekwire.com/2017/smart-devices-can-lead-stupid-mistakes-make-sure-youre-really-wiping-sensitive-data/>.
Newman Hay, Lilly, "An Elaborate Hack Shows How Much Damage IoT Bugs Can Do", Wired, Apr. 16, 2018 1:00 PM, 8 pages, <https://www.wired.com/story/elaborate-hack-shows-damage-iot-bugs-can-do/>, (Apr. 16, 2018).
Rottigni, Roberta, "The Growing Importance of Data Security for IoT", Readwrite, Jun. 18, 2018, 2 pages, <https://readwrite.com/2018/06/18/the-growing-importance-of-data-security-for-iot/>.

\* cited by examiner

US 10,938,826 B2

INTELLIGENT DEVICE SECURITY

TECHNICAL FIELD

The present disclosure relates generally to the field of device security and more specifically to security of intelligent devices.

BACKGROUND

An intelligent device is any type of equipment, instrument or machine that has its own internal computing capabilities. A network of intelligent devices can be interconnected together to form an internet of things (IoT). An IoT is a system of interrelated computing devices, mechanical or digital machines, objects, animals and/or people that are provided with unique identifiers (UIDs). The IoT allows for the ability to transfer data over computer networks without requiring human-to-human or human-to-computer interaction. The intelligent devices that make up the IoT can be any number of different types of objects. For example, a person with a heart monitor implant, animals with a microchip implant or transponder, home appliances, lightbulbs, an automobile with built in sensors and/or any natural or synthesized object that can be assigned an IP address and is capable of transferring data over a computer network.

An IoT ecosystem can comprise intelligent devices that use embedded processors, sensors and communication hardware to collect, send and act on data acquired from the IoT network and an intelligent device's surrounding environment. Intelligent devices can share the data they collect by connecting to an IoT gateway or other edge device, wherein the data can be sent to a cloud computing environment or analyzed by locally operating computer systems. Intelligent devices can communicate with one another or other related devices on the computer network. The connectivity, networking and communication protocols used can allow for the intelligent devices to interact without much (if any) human interaction.

SUMMARY

A first embodiment of the present disclosure provides a computer-implemented method comprising the steps of: receiving a request from a user to securely delete data associated with an intelligent device; analyzing a device profile and a knowledge base of the intelligent device, the knowledge base comprising a set of learning data; identifying, as a function of analyzing the device profile and knowledge base, one or more communications between the intelligent device and one or more network-accessible intelligent devices connected to an internet-of-things network; establishing a remote connection with the one or more network-accessible intelligent devices identified as having previously communicated with the intelligent device; deleting the set of learning data locally stored by the intelligent device and a second set of learning data describing the intelligent device and the user, stored by a second knowledge base of the network-accessible intelligent device; and reporting a successful or failed deletion of the set of learning data and the second set of learning data.

A second embodiment of the present disclosure provides a computer system comprising one or more processors; and a computer-readable storage media coupled to the one or more processors, wherein the computer readable storage media contains program instructions executing a computer-implemented method comprising the steps of: receiving a request from a user to securely delete data associated with an intelligent device; analyzing a device profile and a knowledge base of the intelligent device, the knowledge base comprising a set of learning data; identifying, as a function of analyzing the device profile and knowledge base, one or more communications between the intelligent device and one or more network-accessible intelligent devices connected to an internet-of-things network; establishing a remote connection with the one or more network-accessible intelligent devices identified as having previously communicated with the intelligent device; deleting the set of learning data locally stored by the intelligent device and a second set of learning data describing the intelligent device and the user, stored by a second knowledge base of the network-accessible intelligent device; and reporting a successful or failed deletion of the set of learning data and the second set of learning data.

A third embodiment of the present disclosure provides a computer program product comprising: one or more computer readable storage media having computer-readable program instructions stored on the one or more computer readable storage media, said program instructions executes a computer-implemented method comprising the steps of: receiving a request from a user to securely delete data associated with an intelligent device; analyzing a device profile and a knowledge base of the intelligent device, the knowledge base comprising a set of learning data; identifying, as a function of analyzing the device profile and knowledge base, one or more communications between the intelligent device and one or more network-accessible intelligent devices connected to an internet-of-things network; establishing a remote connection with the one or more network-accessible intelligent devices identified as having previously communicated with the intelligent device; deleting the set of learning data locally stored by the intelligent device and a second set of learning data describing the intelligent device and the user, stored by a second knowledge base of the network-accessible intelligent device; and reporting a successful or failed deletion of the set of learning data and the second set of learning data.

BRIEF DESCRIPTION OF THE DRAWINGS

FIG. 4b depicts a flow diagram that is a continuation of the operational steps of the computerized method of FIG. 4a.

DETAILED DESCRIPTION

Overview

Figure 1:
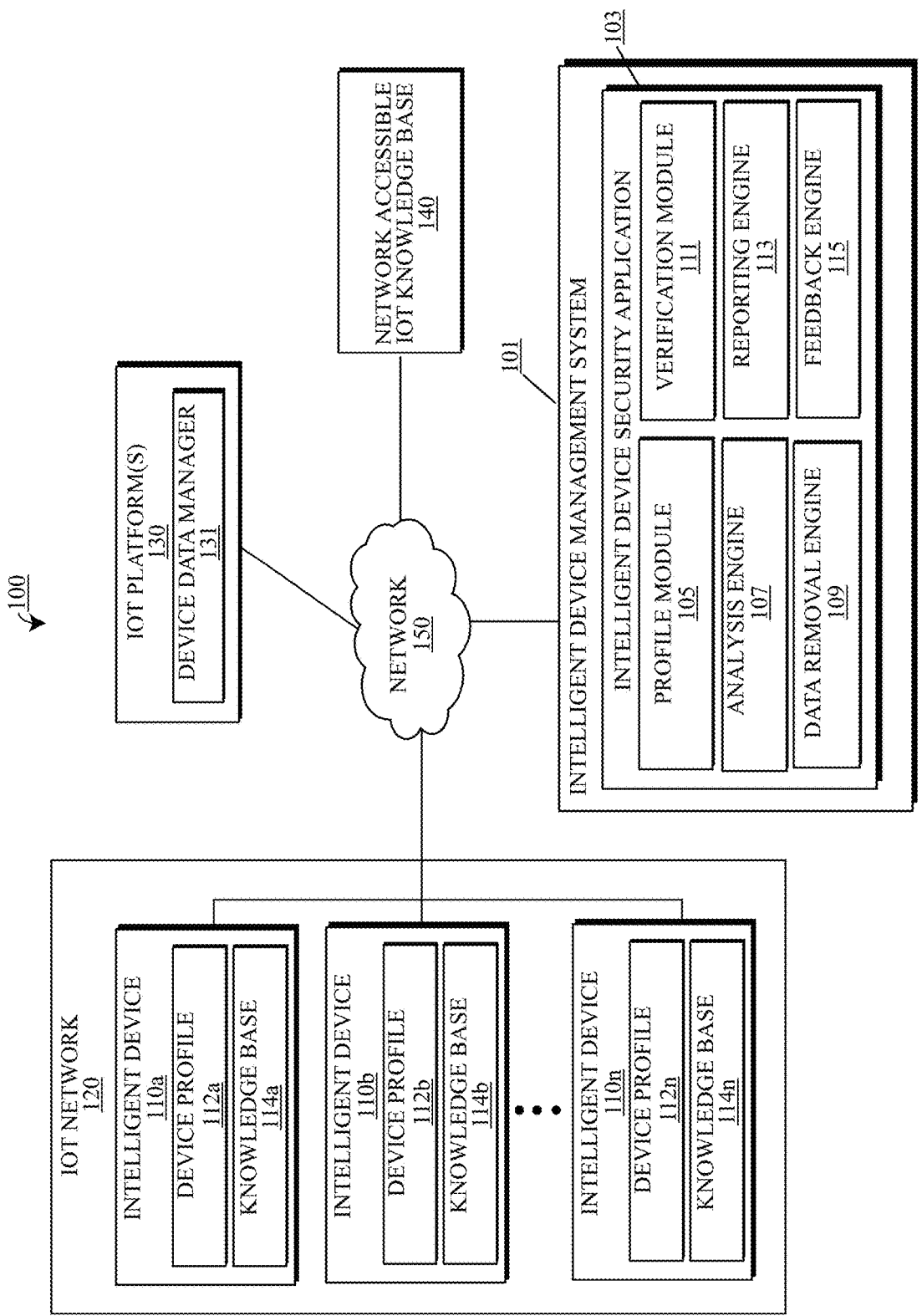
FIG. 1 depicts a functional block diagram describing an embodiment of a computing environment in accordance with the present disclosure.

Markets for second-hand items and used products have expanded significantly since the mainstream implementation of internet-centric commerce. Connecting buyers and sellers willing to engage in commercial activity has never been easier. Individuals and groups can connect to each other in order to buy and sell nearly any product or service that may be available, including intelligent devices. Embodiments of the present disclosure recognize that the sale or transfer of intelligent devices from one user to another user may pose a security risk if proper precautions are not taken prior to the transfer of ownership or possession of the intelligent device. Intelligent devices typically learn about the user's preferences, habits, and routines by storing detailed sets of information about the user (learning data), often to predict the patterns of the user's behavior and improve responses by the intelligent device(s) reacting to the user's behavior. Not only may the learning data be stored locally on the intelligent device, but intelligent devices may share some or all of the learning data with additional network-accessible intelligent devices and IoT platforms managing the intelligent device, making tracking and/or removing data difficult because intelligent devices may share data amongst each other with little interaction or knowledge by users that such data has been shared between intelligent devices and/or platforms.

Embodiments of the present disclosure recognize that flushing device data, user data and learning data from the intelligent device before completing the transfer of the intelligent device to a new owner may be a complicated process. Intelligent devices may restrict access to the knowledge bases and profiles locally stored by the intelligent device, limit the ability of users to interface with the intelligent device and/or restrict the ability to specifically identify which additional intelligent devices or platforms may be communicating with the user's intelligent device, hindering the user's ability to track down and remove the different types of data that have been shared amongst a plurality of intelligent devices and/or IoT platforms that may be managing the intelligent devices. Embodiments of the present disclosure improve upon methods of manual data flushing by automating the removal, deletion and/or nullification of learning data, user profile data, device data, and other forms of data that may be stored by the intelligent device, networks of intelligent devices communicating with the intelligent device being flushed and IoT platforms accessed by the intelligent device.

Embodiments of the present disclosure may use profile data, device data and/or learning data stored locally by the intelligent device to reverse engineer and identify the intelligent devices of an intelligent device network that have been placed in communication with the intelligent device being flushed. For example, by examining device identifying data, authentication credentials, authorizations, permissions, communication logs and/or additional attributes stored by the intelligent device providing to access particular devices or platforms stored by the intelligent device. Embodiments of the present disclosure can use the data stored locally by intelligent devices to connect with each identified device of the device network and/or IoT platforms and request removal of the device's profiles, device data, user data, learning data, etc., removing the traces of data that may link the intelligent device back to the current user(s). Embodiments of the present disclosure can test that the removal of the data has been successfully completed by running simulation programs on the intelligent device to confirm learning data and profiles have been removed from the intelligent device, the network of intelligent devices communicating with the intelligent device and the IoT platforms that may be managing or offering services to the intelligent device. Moreover, embodiments of the present disclosure can disassociate user profiles from the intelligent device, allowing for the user to link the user profile and learning data flushed from one intelligent device to different intelligent devices that may be obtained by the user at a future point in time.

System for Securely Flushing Data from Intelligent Devices

Although certain embodiments are shown and described in detail, various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 2:
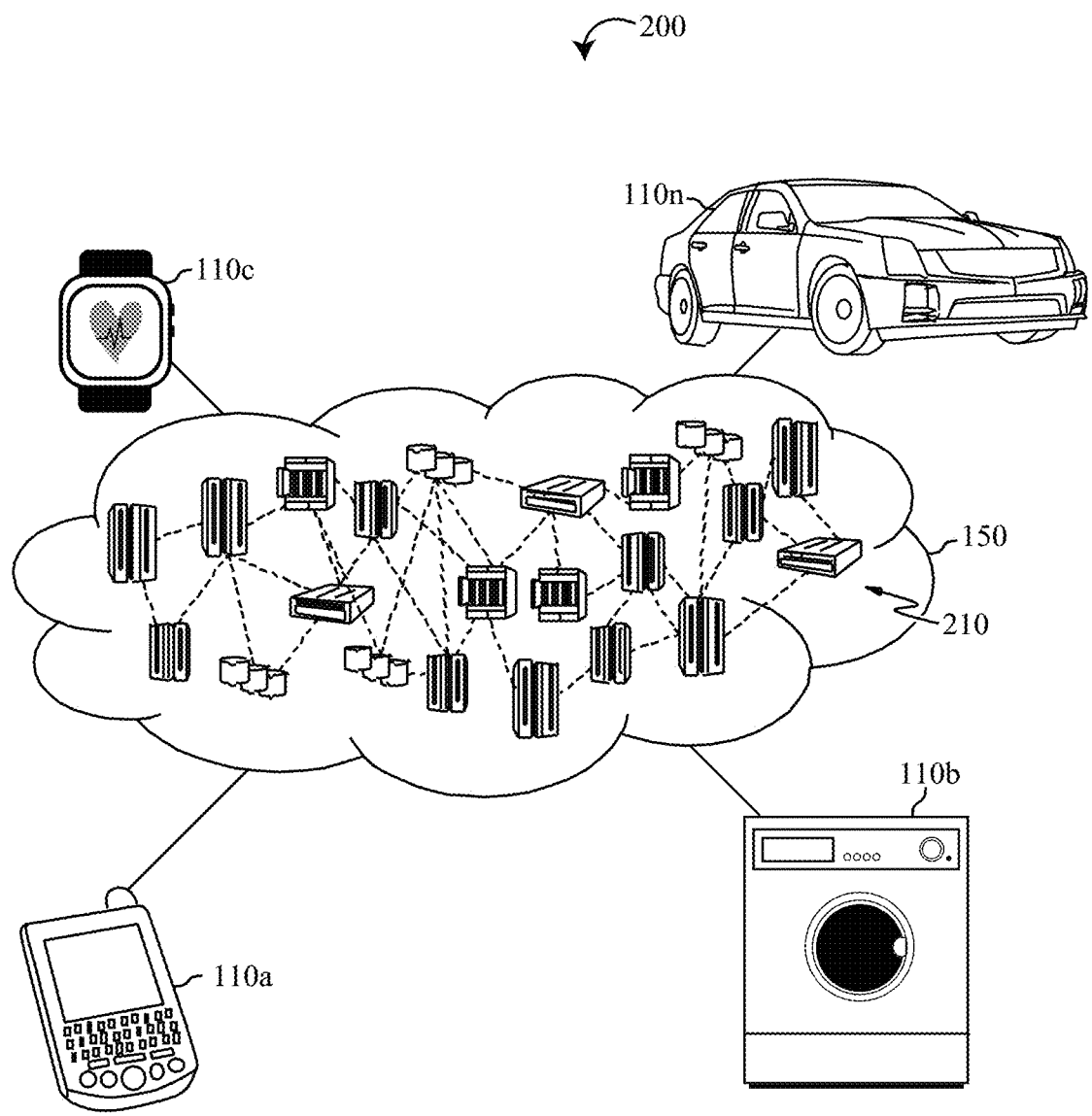
FIG. 2 depicts an embodiment of a cloud computing environment in accordance with the present disclosure.
Figure 3:
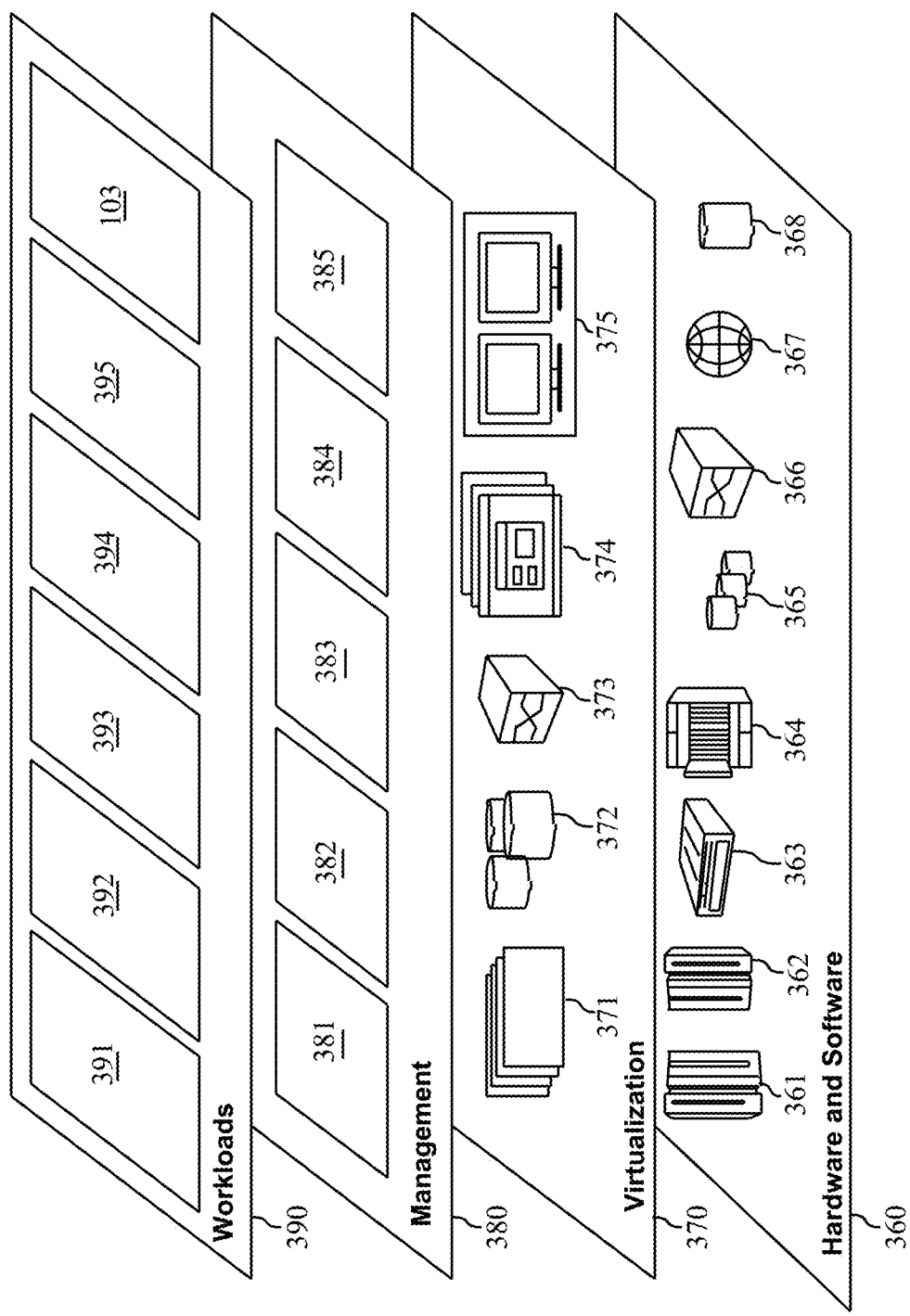
FIG. 3 depicts an embodiment of abstraction model layers of a cloud computing environment in accordance with the present disclosure.

Referring to the drawings, FIGS. 1-3 depict diagrams of a computing environment 100, 200 capable of implementing automated data flushing operations. Data flushing operations can include the operations of removing, nullifying, deleting and/or destroying sensitive or identifying user data, learning data, device data and other types of data maintained or stored by one or more intelligent devices 110a, 110b . . . 110n (referred herein generally or singularly as intelligent device 110) and/or IoT platform(s) 130. Embodiments of computing environment 100, 200 may include a plurality of computer systems and devices interconnected via a computer network 150 and/or an IoT network 120. The interconnected computer systems and devices may include one or more intelligent devices 110, an intelligent device management system 101, one or more IoT platform(s) 130, one or more network-accessible IoT knowledge bases 140 and/or one or more additional network accessible computer systems 500.

Figure 5:
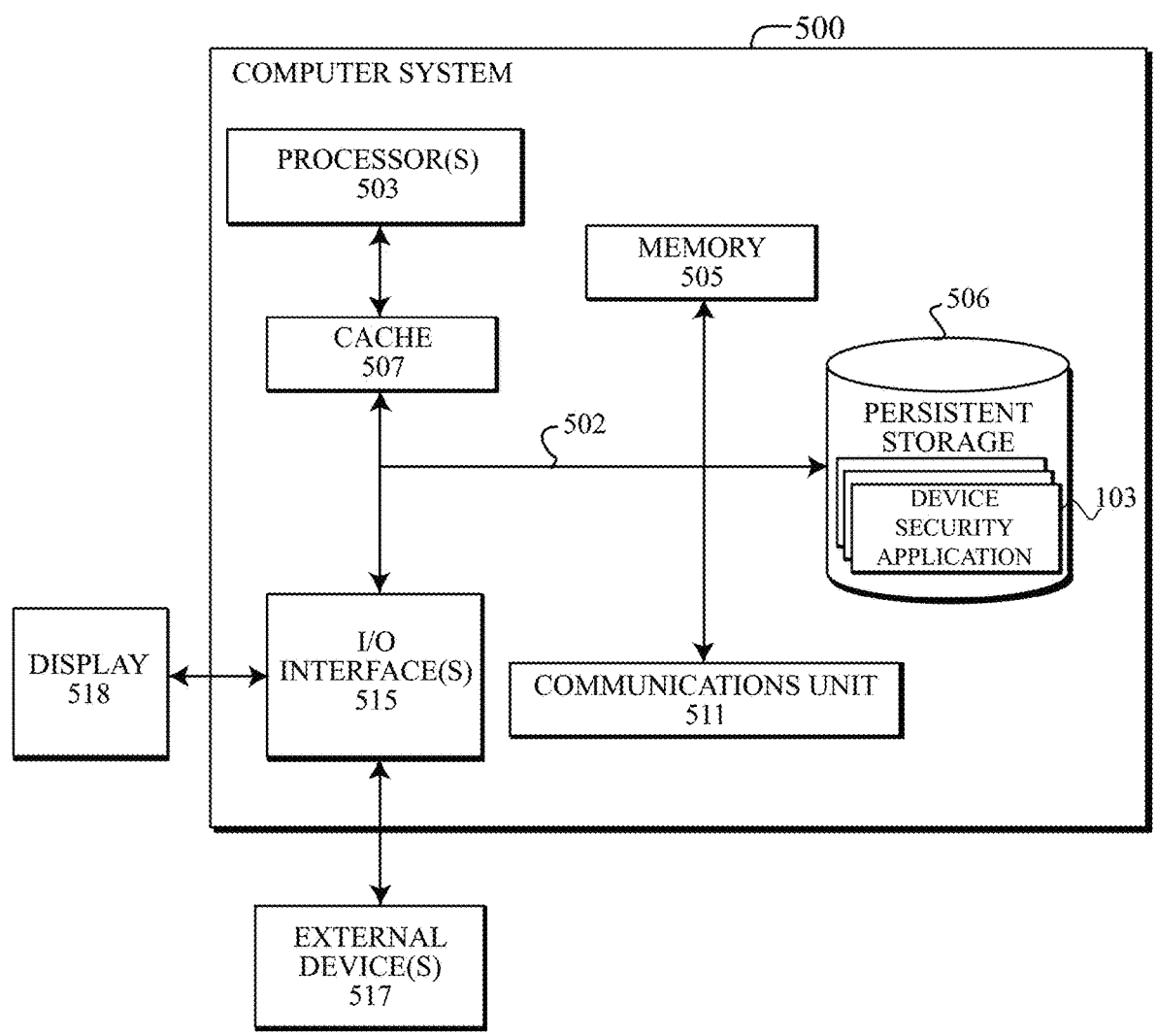
FIG. 5 depicts an embodiment of a block diagram of internal and external components of a computer system in accordance with the embodiments of the present disclosure.

Intelligent devices 110, intelligent device management system 101, IoT platform(s) 130, network accessible IoT knowledge base 140, and other network accessible systems such as one or more computer systems 500, may each be a specialized computer system comprising specialized configurations of hardware, software or a combination thereof, as shown and described in FIGS. 1-3 of the present disclosure and in embodiments described herein. Embodiments of the Intelligent devices 110, intelligent device management system 101, IoT platform(s) 130, network accessible IoT knowledge base 140 and other network accessible systems, may not only comprise the elements of the systems and devices depicted in FIGS. 1-3, but may also incorporate one or more elements of a computer system 500, as shown in FIG. 5, and described in the COMPUTER SYSTEM section below. One or more components of the computer system 500 may be integrated into each of the specialized computer systems of computing environment 100, 200, including the integration of one or more processor(s) 503, communications fabric 502, memory 505, persistent storage 506, cache 507, communications unit 511, I/O interface(s) 515, external device(s) and/or human-readable display(s) 518.

Embodiments of the intelligent device management system 101 and the computer systems running the IoT platform(s) 130, network-accessible IoT knowledge base 140 and other network accessible systems, may be desktop computers, laptop computers, tablet computers, mobile computing devices, wearable computing devices (e.g. watches and glasses), servers, or any other type of computer system known by persons skilled in the art. Embodiments of intelligent devices 101 may include any standard or non-standard computing device that may connect to one or more computer networks 120,150 and/or have the ability to transmit data over a computer network 120, 150. In addition to standard computing devices such as mobile computing device 110a, examples of intelligent devices 101 may further include, but are not limited to appliances 110b, wearable devices 110c, automobiles 110n, sensor devices, monitoring devices, smart meters, security systems, air conditioners, lighting systems, thermostats, speakers, cameras, human-readable displays 518, televisions, computerized assistants, remote control devices, sprinkler systems, locking devices, medical devices, etc. In some embodiments intelligent devices 110, intelligent device management system 101, IoT platform(s) 130, network accessible IoT knowledge base 140 and other network accessible systems, may represent computer systems utilizing clustered computers and components to act as a single pool of seamless resources when accessed through network 150 or IoT network 120. For example, such embodiments may be used in a data center, cloud computing environment 200, storage area network (SAN) and network attached storage (NAS) applications.

In some embodiments, intelligent devices 110, intelligent device management system 101, IoT platform(s) 130, network accessible IoT knowledge base 140 and other network accessible systems may represent virtual machines provisioned by a host computer on IoT network 120 and/or network 150. For example, an intelligent device 110 partitioned by an IoT platform 130 may host a plurality of separate intelligent device functions provisioned to the intelligent device 110 by an IoT platform 130. For example, a wearable smart device provisioned as a virtual machine hosting a plurality of virtualized sensor functions, smart remote-control functions, smart display features, computerized assistant functions, camera functions, monitoring functions, etc. In general, intelligent devices 110, intelligent device management system 101, IoT platform(s) 130, network accessible IoT knowledge base 140 and other network accessible systems may be representative of any electronic devices, or combination of electronic devices, capable of executing machine-readable program instructions, as described in greater detail with regard to FIGS. 4a-4b below.

Embodiments of the intelligent devices 110, intelligent device management system 101, IoT platform(s) 130, network accessible IoT knowledge base 140, and other network accessible systems, may each be connected and placed into communication with one another over a network 150 and/or an IoT network 120 interconnecting a plurality of intelligent devices 110 (as depicted in FIG. 1). Embodiments of the network 150 and/or IoT network 120 may be constructed using wired, wireless or fiber optic connections. Embodiments, intelligent devices 110, intelligent device management system 101, IoT platform(s) 130, network accessible IoT knowledge base 140 and other network accessible systems may connect and communicate over the network 150 and/or IoT network 120 using a communications unit 511, such as a network interface controller or other network communication hardware.

Embodiments of the communications unit 511 may implement specialized electronic circuitry allowing for communication using a physical layer and a data link layer standard. For example, Ethernet, Fiber channel, Wi-Fi or Token Ring. Communications unit 511 may further allow for a full network protocol stack, enabling communication over network 150 or IoT network 120 to the group of intelligent devices 110, intelligent device management system 101, IoT platform(s) 130, network accessible IoT knowledge base 140, computer systems 500 or other computing hardware devices linked together through the communication channels. The network 150 and/or IoT network 120 may facilitate communication and resource sharing among the intelligent devices 110, intelligent device management system 101, IoT platform(s) 130, network accessible IoT knowledge base 140, and other network accessible systems connected to the computer networks 120, 150. Examples of network 150 and/or IoT network 120 may include a local area network (LAN), home area network (HAN), wide area network (WAN), back bone networks (BBN), peer to peer networks (P2P), storage area network (SAN), campus networks, enterprise networks, the Internet, cloud computing networks and any other network known by a person skilled in the art.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 200 is service oriented with a focus on statelessness, low coupling, modularity, and semantic interoperability. At the heart of cloud computing is an infrastructure that includes a network of interconnected nodes.

Referring to the drawings, FIG. 2 is an illustrative example of a cloud computing environment 200. As shown, cloud computing environment 200 includes one or more intelligent devices 110 owned, operated or maintained by cloud consumers connected to a cloud-based network 150 comprising a plurality of network nodes 210. Examples of the Intelligent devices shown include a mobile computing device 110a, appliances 110b, wearable device 110c, and/or an automobile system 110n. Embodiments of the intelligent devices 110 may communicate with one another and may be grouped (not shown) physically or virtually, in one or more networks, such as Private, Community, Public, or Hybrid clouds as described herein, or a combination thereof. This may allow cloud computing environment 200 to offer infrastructure, platforms and/or software as services for which a cloud consumer does not need to maintain resources locally on the intelligent device 110, including the IoT platform(s) 130 and the intelligent device management system 101. It is understood that the types of intelligent devices 110 shown in FIG. 2 are intended to be illustrative only and that intelligent devices 110 of the cloud computing environment 200 can communicate with any type of computerized device over any type of network and/or network addressable connection (e.g., using a web browser).

Referring now to FIG. 3, a set of functional abstraction layers provided by cloud computing environment 200 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment 200. Metering and pricing 382 provide cost tracking as resources are utilized within the cloud computing environment 200, and billing or invoicing for consumption of these resources. In one example, these resources can include application software licenses. Security provides identity verification for cloud consumers and tasks, as well as protection for data and other resources. User portal 383 provides access to the cloud computing environment 200 for cloud consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment 200 may be utilized. Examples of workloads and functions which may be provided from this layer include: machine learning models 391; software development and lifecycle management 392; data curation 393; data analytics processing 394; report processing 395 and intelligent device security application 103.

Embodiments of the intelligent devices 110 operating within the computing environment 100, 200 may be connected with each other to form an IoT network 120. The IoT network 120 allows communication to occur between one or more intelligent devices 110. Intelligent devices 110 communicating over the IoT network 120 may exchange data or sets of data stored locally by each individual intelligent device 110 and/or stored remotely on one or more IoT platform(s) 130 that may be managing one or more intelligent devices 110 of the IoT network 120. Embodiments of intelligent devices 110 may store and communicate various types of data between each intelligent device 110 of the IoT network 120. Examples of data that can be stored and exchanged by the intelligent devices 110 include personalized user data and information, such as a user's name, location, address, email address, phone number and other forms of contact information. Embodiments of the intelligent device 110 may further store and maintain device-specific data. For example, an intelligence device's 110 ID, name, model, serial number, IP address, MAC address, access permissions, authentication credentials for the IoT network 120 as well as authentication credentials for one or more IoT platforms 130, credentials for accessing individual intelligent devices and/or additional networks 150 placed in communication with the intelligent device 110. Personalized user data and/or device-specific data may be stored as part of a profile, such as the device profile 112*a*, 112*b* . . . 112*n* (referred to generally as "device profile 112") depicted in FIG. 1.

The device profile 112 may be stored locally within the memory 505 or persistent storage 506 of one or more intelligent devices 110. Embodiments of the intelligent devices 110 may leverage the IoT network 120 to perform various functions of the intelligent devices 110 using the data stored by the device profile 112. Communication between intelligent devices 110 can occur across the IoT network 120 and in the process of communication, device profiles 112 comprising personalized user data, and device information can be exchanged and stored by a plurality of intelligent devices 110 within the IoT network 120. In some embodiments, information stored as part of the device profile 112 may also be transmitted and stored by an IoT platform 130. For example, the IoT platform 130 can be a cloud-based service that manages one or more intelligent devices 110 of the IoT network 120. The IoT platform 130 can store the device profile 112 as part of a cloud-based storage network, provision functions to intelligent devices and share intelligent device 110 data with other intelligent devices 110 connected to the IoT platform 130.

In some embodiments, intelligent devices 110 may collect and store learning data as part of a knowledge base 114*a*, 114*b* . . . 114*c* (hereinafter referred to generally as knowledge base 114). Learning data may be described as one or more data sets inputted, measured and/or collected by an intelligent device 110 which may teach the intelligent device 110 how to process information related to the user(s) or environments associated with the intelligent device 110. Learning data may be ingested by the intelligent device 110 and processed using one or more algorithms to teach the intelligent device 110 to find relationships, develop understanding, make decisions and evaluate a level of confidence an intelligent device 110 may have to make decisions based on the learning data that is accessible to the intelligent device 110. Learning data from one or more intelligent devices 110 and/or IoT platform(s) may be the underlying data used by intelligent devices 110 to make predictions about the behavior, preferences, habits, activities or other data inputs associated with one or more user(s) and/or environments. Examples of learning data may include data sets compiled from sensor readings, location data, video inputs, voice/audio inputs, monitoring user habits and activities, browser history, text inputs, communications, etc. Sets of learning data stored by the knowledge base 114 of an intelligent device 110 may be transmitted and shared with additional intelligent devices 110 of the IoT network 120 and/or one or more IoT platform(s) 130. By sharing the sets of learning data with additional intelligent devices 110, each intelligent device 110 of an IoT network 120 may be leveraged to increase the overall amount of data collected about a user(s) and/or environment, improve the overall training of one or more algorithms, improving the predictive accuracy of IoT networks 120 and each device connected within the IoT network 120.

Learning data collected by individual intelligent device 110 and/or sets of learning data shared amongst the IoT network 120, may be stored or maintained by one or more knowledge bases 114, either locally within one or more intelligent devices 110 or as part of a centralized repository which may operate as a knowledge base 114 for the entire IoT network 120. The term "knowledge base" may refer to a human readable or machine-readable resource for disseminating and optimizing information collection, organization and retrieval. The knowledge base 114 and the network accessible IoT knowledge base 140 (described in further detail below) may draw upon the knowledge of humans and artificial intelligence that has been inputted as a machine-readable form and may be structured as a database in some embodiments. Embodiments of the knowledge bases 114, 140 may be used to find solutions to current and future situations by using the data inputted into the knowledge bases 114, 140, from past experiences to make informed decisions and/or predictive responses using the historical data stored by the knowledge bases 114, 140.

Embodiments of the knowledge bases 114, 140 shown in the exemplary embodiment of computing environment 100 may not be simply a static collection of information. Rather, the knowledge bases 114, 140 may be a dynamic resource having the cognitive capacity for self-learning, using one or more data modeling techniques and/or by working in conjunction with one or more machine learning programs to improve functions of each intelligent device 110 or the collective functionality of the IoT network 120 in the case of knowledge base 114 and/or improving the procedures for flushing data from intelligent devices 110, in the case of the network-accessible IoT knowledge base 140. Embodiments of the knowledge bases 114, 140 may apply problem solving logic and use one or more problem solving methods to provide a justification for conclusions reached based on the processing of the learning data or other additional data inputted into the knowledge bases 114, 140. Exemplary embodiments of knowledge base 114 may be a machine-readable knowledge base 114 that may receive, and store learning data collected by the intelligent device 110 as well as learning data shared by other intelligent devices 110 of an IoT network 120, that may be communicating with each other.

Embodiments of the knowledge bases 114, 140 may include components such as a facts database, rules engine, a reasoning engine, a justification mechanism and a knowledge acquisition mechanism. The facts database may contain the knowledge base's current fact pattern of a situation, which may comprise collected or shared learning data describing a set of observations about a user or the environment surrounding a particular intelligent device 110. For example, sensor readings of a vehicle or surrounding environment, location data, the time of day a user returns home or commutes to work, or other routine patterns or habits of a user. Embodiments of the rules engine of knowledge base 114, 140 may be a set of universally applicable rules that may be created based on the experience and knowledge of the practices of experts, developers, programmers and/or contributors to knowledge bases 114, 140. The rules created by the rules engine may be generally articulated in the form of if-then statements or in a format that may be converted to an if-then statement. The rules of knowledge bases 114, 140 may be fixed in such a manner that the rules may be relevant to all or nearly all situations covered by the knowledge bases 114, 140. While not all rules may be applicable to every situation being analyzed by the knowledge bases 114, 140, where a rule is applicable, the rule may be universally applicable.

Embodiments of the reasoning engine of knowledge bases 114, 140 may provide a machine-based line of reasoning for solving problems, such as predicting a user's habit or patterns and implementing a function of an intelligent device 110 using the learning data describing the user's known habit or pattern. For example, an intelligent device 110 that operates as a smart thermostat may communicate with another intelligent device 110 of an IoT network 120, a user's car. Using the learning data of the car, the thermostat can adjust the temperature of the user's home after the user leaves and right before the user is expected to arrive back at the user's home. Embodiments of the reasoning engine may process the facts in the fact database and the rules of the knowledge bases 114, 140. In some embodiments of the knowledge bases 114, 140, the reasoning engine may also include an inference engine which may take existing information in the knowledge bases 114, 140 and the fact database, then use both sets of information to reach one or more conclusions and/or implement an action. Embodiments of the inference engine may derive new facts from the existing facts of the facts database using rules and principles of logic.

Embodiments of the justification mechanism of the knowledge bases 114, 140 may explain and/or justify how a conclusion by knowledge bases 114, 140 are reached. The justification mechanism may describe the facts and rules that were used to reach the conclusion. Embodiments of the justification mechanism may be the result of processing the facts of a current situation in accordance with the entries of the knowledge bases 114, 140, the reasoning engine, the rules and the inferences drawn by the knowledge bases 114, 140. The knowledge acquisition mechanism of the knowledge bases 114. 140 may be performed by a manual creation of the rules, a machine-based process for generating rules or a combination thereof.

Embodiments of the computing environment 100, 200 may include an intelligent device management system 101 capable of performing one or more tasks or functions associated automating operations for flushing data stored by one or more intelligent devices 110, an IoT network 120 of intelligent devices 110 and/or IoT platform(s) 130. Flushing operations performed by the intelligent device management system 101 may be performed upon request of a user accessing the intelligent device management system 101 directly, or indirectly by remotely commencing flushing operations via an intelligent device 110 requesting data flushing to be performed. Data flushing operations may be implemented by reverse engineering previous communications between one or more intelligent devices 110 which may be connected to one another via IoT network 120, and/or one or more IoT platform(s), using the device data, personal data and learning data stored locally by the device profile 112 and knowledge base 114 of the intelligent device 110. Embodiments of intelligent device management system 101 may refer to a computer, device or a program that may be tasked with managing data and security of intelligent devices 110 connected to the network 150 and/or an IoT network 120. Embodiments of the intelligent device management system 101 may be a server computer which may include a computer program, application or cloud-based service, that provides automated flushing services to each intelligent device 110, computer systems 500 or computer programs (and users thereof) connecting to the intelligent device management system 101 via a network 150 or IoT network 120.

Embodiments of the intelligent device management system 101 may coordinate and perform automated data flushing operations in accordance with the program instructions provided by one or more programs loaded into the persistent storage 506 or other computer readable storage media accessible the intelligent device management system 101. In the exemplary embodiment of the computing environment 100, 200 the intelligent device management system 101 may comprise an intelligent device security application 103 performing the automated data flushing operations. Embodiments of the intelligent device security application 103 may include one or more processes, services, engines and/or modules specializing in performing one or more specific tasks associated with flushing, securing and managing the data stored and shared between intelligent devices 110, as well as between intelligent devices 110 and IoT platform(s) 130. The intelligent device security application 103 may provide security and removal services directed toward data stored within a device profile 112 of the intelligent device 110 including the user data, and device. Moreover, the intelligent device security application 103 may also provide data removal services for removing learning data from each knowledge base 114, which may describe a user's activity, patterns, habits, location, preferences, etc. Embodiments of the intelligent device security application 103 depicted in FIG. 1, may comprises one or more components, including, but not limited to a profile module 105, analysis engine 107, data removal engine 109, verification module 111, reporting engine 113 and feedback engine 115.

The term "module" may refer to a hardware module, a software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 505 devices and/or persistent storage 506 devices. A software-based module may be part of a program, program code or linked to program code containing specific programmed instructions loaded into a memory 505 device or persistent storage 506 device of the intelligent device management system 101 or as a network accessible application, running in an application layer of a network 150 and/or IoT network 120.

Embodiments of the intelligent device security application 103 may comprise a profile module 105. The profile module 105 may perform functions or tasks of the intelligent device security application 103 directed toward organizing and maintaining information about users of the intelligent device security application 103, maintain and provide administrative permissions to the intelligent device management system 101 to manage profiles of intelligent devices 110, allowing for the intelligent device management system 101 to connect and talk to a list of intelligent devices of the IoT network 120 or IoT platform(s) 130 that interact with the intelligent device 110 utilizing the intelligent device management system 101. The profile module 105 may create and store user information describing the user of the intelligent device security application 103, authorization credentials to access the services of the intelligent device management system 101, preferences or settings (including user preferred flushing methods and/or preferred verification simulations), intelligent devices 110 associated with each user, including the intelligent device's 110 ID, make, model, IP address, and other device details that may be stored by a device profile 112.

Embodiments of the profile module 105 may copy and store information saved as part of each intelligent device 110 device profile 112. In some embodiments, a profile created by the profile module 105 may track which intelligent devices 110 have been previously flushed by intelligent device security application 103, log the result of the flushing operations as successful or unsuccessful, and/or maintain records that may indicate whether intelligent devices 110 associated with a user are safe for transferal to another user or third party. Users of the intelligent device security application 103 may update their user profile to indicate when new intelligent devices 110 have been acquired and/or when transference of an intelligent devices 110 has been completed to a new user, owner or third party.

A user accessing the intelligent device management system 101, may provide authorization credentials to access the intelligent device security application 103, load up a user profile maintained by the profile module 105 and/or select one or more operations to perform based on the information associated with the user as part of the profile module's 105 records. For example, a user accessing the intelligent device security application 103 logins to the intelligent device management system 101, selects an operation such as flushing data from an intelligent device 110 and selects which intelligent device 110 listed within the user's profile to commence flushing operations. Users may access, provide inputs and communicate with the intelligent device management system 101 via a user interface. Embodiments of the user interface may be accessible via the intelligent device 110, for example as graphical user interface integrated into the intelligent device or accessible by a separate computing system 500 or client device connected to network 150.

Embodiments of the intelligent device security application 103 may comprise an analysis engine 107. The analysis engine 107 may perform the tasks or functions of the intelligent device security application 103 associated with analyzing the intelligent device 110 requested to have data flushed, for evidence of data stored by the intelligence device 110 that may indicate one or more additional intelligent devices 110 of the IoT network 120 and/or IoT platform(s) 130 that may have communicated with the intelligent device 110 being flushed. Each intelligent device 110 of the IoT network 120 and/or platform that may have communicated with the intelligent device 110 requested to be flushed, may have received and/or stored one or more data sets that may describe the intelligent device 110 being flushed, including one or more pieces of data stored by the device profile 112, personal user data describing one or more users of the intelligent device 110 and learning data stored by the knowledge base 114.

Embodiments of the analysis engine 107 may perform the analysis of the intelligent device 110 requested to be flushed by connecting to the intelligent device 110 either directly or remotely via network 150. The analysis engine 107 may analyze data stored locally on the intelligent device 110, including the data maintained by the device profile 112 as well as communication logs, which may provide dates, times and event wherein the intelligent device connected to and communicated with other intelligent devices 110 of the IoT network 120 and/or IoT platform(s). Moreover, during analysis of the intelligent device 110 seeking to be flushed, the analysis engine 107 may review the device profile 112 for saved access credentials or authorization data that would permit the intelligent device 110 to connect and interface with other intelligent devices of the IoT network 120 and/or IoT platform(s). Using the information obtained from the device profile 112, communication logs and other evidence identifying communication with additional intelligent devices 110 or IoT platform(s) that may have received user data, device data, and/or learning data from the intelligent device 110 being flushed, the analysis engine 107 may prepare a list of intelligent devices 110, IoT networks 120 and/or IoT platforms for further data processing, removal or additional actions to be performed as part of the data flushing operations. Additional components the intelligent device management system 101 may use the information identified by the analysis engine 107 to individually connect to each intelligent device 110 and/or IoT platform 130 and remove, delete, nullify and/or prevent further use of the stored data in association with the intelligent device 110 being flushed.

In some embodiments of the analysis engine 107, the analysis engine 107 may query a network accessible IoT knowledge base 140 (referred to herein as "IoT knowledge base 140") for procedures and instructions that may be known or best practices for securely flushing an intelligent device 110 and/or intelligent device data from other intelligent devices 110 on an IoT network 120 and platform(s). For example, the IoT knowledge base 140 may be populated with information from various instruction manuals, manufacturer recommendations, past user contributions and advice from industry experts, specific to one or more intelligent devices 110.

Embodiments of the IoT knowledge base 140 may allow for the intelligent device security application 103 to query intelligent device 110 instructions and/or recommendations specific to the intelligent device being flushed, which may be provided by previous users, contributors, manufacturers, IoT platform 130 owners and administrators as well as third party resellers and distributors. As part of the query, the analysis engine 107 or profile module 105 may provide information about the intelligent device 110 being flushed to receive instructions that may be the most appropriate for that specific intelligent device 110. For example, querying the IoT knowledge base 140 using (at least in part) intelligent device 110 information such as the intelligent device name, manufacturer, model number, serial number, device ID, or any other device identifying information.

In some embodiments, the analysis engine 107 may not only query specific instructions for the intelligent device 110 being flushed, but may also request any known instructions or procedures that may be stored by the IoT knowledge base 140 which may assist the intelligent device security application's 103 removal of data from network accessible intelligent devices 110 of the IoT network 120 and/or IoT platform(s) 130 managing the intelligent devices 110 of the IoT network 120. For example, the analysis engine 107 queries and receives instructions about the best practices for flushing intelligent device 110a and after analyzing the device profile 112, communication logs and other identifying information indicating that intelligent device 110b has previously communicated with intelligent device 110a, the analysis engine 107 queries IoT knowledge base 140 for additional instructions and procedures that may further assist with removing data associated with intelligent device 110a from intelligent device 110b.

The intelligent device security application 103 may comprise a data removal engine 109 in some embodiments. Embodiments of the data removal engine 109 may perform functions or tasks of the intelligent device security application 103 responsible for removing and/or requesting the removal of data stored by the intelligent device 110 being flushed, intelligent devices 110 of the IoT network 120 that may have communicated with the intelligent device 110 being flushed and/or one or more IoT platform(s) 130 that may have managed the intelligent device 110 being flushed. Using the communication information identified by the analysis engine 107 and/or the instructions or procedures provided by the IoT knowledge base 140, embodiments of the data removal engine 109 may implement one or more actions to prevent the data associated with the intelligent device 110 being flushed, from being used any further. For example, the data removal engine 109 connects to an intelligent device using the information identified by the analysis engine 107, such as authorization credentials, connection certificates, etc. to connect to the intelligent device 110 containing information associated with the intelligent device 110 being flushed and performing an action that may delete, nullify or restrict further use of the intelligent device data, and/or disassociate data (such as a user profile) from the intelligent device 110.

In some embodiments of the data removal engine 109, the data removal engine 109 may search a storage system or file system of each intelligent device 110 and/or IoT platform(s) for information associated with the intelligent device 110 being flushed. For example, the data removal engine 109 searches the records of the intelligent device 110 using the known information stored by the device profile 112 of the intelligent device being flushed. For instance, by searching records for a device ID, device name, IP address, etc. Information identified by the data removal engine 109 may be marked for removal, deletion, nullification or any other action that may prevent intelligent devices 110, IoT network 120 and/or IoT platform(s) 130 from accessing the data associated with the intelligent device 110 being flushed, in the future. For example, deleting a device profile 112a and learning data associated with the intelligent device 110a from a second intelligent device 110b of the IoT network 120 that previously communicated with the intelligent device 110a and/or from one or more IoT platform(s) that managed the intelligent device 110a.

In some embodiments, the data removal engine 109 may directly access and implement an action affecting the storage and use of the intelligent device 110 data. For example, by directly connecting to a second intelligent device 110 or IoT platform(s) 130 and performing deletion operations to remove the data being stored that is associated with the intelligent device 110 being flushed by the intelligent device security application 103. In alternative embodiments, the data removal engine 109 may interface with one or more intelligent devices 110 and/or IoT platform(s) 130 by submitting a request for an action to be performed by the intelligent device 110 or IoT platform(s) that are currently storing the data associated with the intelligent device 110 being flushed. The intelligent device 110 or IoT platform(s) may implement one or more actions and operations on the data associated with the intelligent device 110 being flushed at the request of the data removal engine 109, instead of the data removal engine 109 implementing the removal or nullification action directly. For example, transmitting a request to a second intelligent device 110b requesting to delete learning data, device data and personal data associated with intelligent device 110a, wherein the second intelligent device 110b performs the deletion operations and confirms the completion of the data deletion operations.

In some embodiments, the action performed by the data removal engine 109 may include disassociating a user profile and/or learning data stored by an intelligent device 110, IoT network 120, and/or IoT platform(s) 130 from the intelligent device 110 being flushed. The data removal engine 109 may instruct the device, network or platform in possession of the user data, learning data, device data or other forms of data associated with a user or intelligent device 110, to preserve the disassociated data instead of removing or deleting the disassociated data. Subsequently, a user may re-associate the data with a new intelligent device 110, allowing for the new intelligent device 110, the IoT network 120 of intelligent devices 110 and the IoT platform(s) to continue operations using the new intelligent device 110 added to the IoT network 120 without having to start over and relearn about the user(s) of the new intelligent device.

In some embodiments of computer environment 100, 200 intelligent device 110 may comprise a localized reset button or action that may be performed to locally reset an intelligent device 110. Initiating a reset locally may reset the device profile 112 and/or knowledge base 114 back to original factory conditions or a previous point in the lifetime of the intelligent device 110. In some embodiments of the intelligent device security application 103, a user attempting to reset the intelligent device 110 locally on the device itself may trigger a communication to the intelligent device security application 103. Embodiments of the intelligent device security application 103 may, in some embodiments prevent the localized reset from occurring, since resetting the data stored by the intelligent device 110 may inhibit the intelligent device security application 103 from identifying previous intelligent devices 110, IoT networks 120 and/or IoT platforms 130 during subsequent flushing operations, since an incomplete record of communications and data may be present due to the erasure of local data caused by the local reset of the intelligent device 110.

In some embodiments, upon receiving an alert that a local reset has been initiated by a user of an intelligent device 110, the intelligent device security application 103 may copy the data and records of the intelligent device 110 before performing the reset, for future reference of historical communications and data sharing with other intelligent devices 110, IoT networks 120 and/or IoT platform(s) that may be recalled during subsequent flushing requests and operations. In alternative embodiments, upon initiating a local reset of an intelligent device 110, the intelligent device security application 103 may analyze the records and data of the intelligent device 110, identify additional intelligent devices 110, IoT networks 120 and IoT platform(s) that have previously communicated with the intelligent device 110 being reset, alert the identified devices, networks and platforms that a local reset is requested and obtain a consensus from each, to proceed with the reset action. Once approval of the reset is received from each past intelligent device 110, IoT network 120 and/or IoT platform 130, the local reset may be performed. In yet another alternative embodiment, a user initiating a local reset of an intelligent device 110 may trigger the intelligent device security application 103 to perform flushing operations of user data, device data and/or learning data from each intelligent device 110, IoT network 120, and IoT platform 130 identified as having previously communicated with the intelligent device 110 performing the local reset.

In some embodiments of the intelligent device security application 103, the intelligent device security application 103 may heal gaps in the flow of information and data between intelligent devices 110 of the IoT network 120 that may have been left behind by the removal of an intelligent device 110 from an IoT network 120, as a result of completing the flushing operations performed by the data removal engine 109. The intelligent device 110 that was flushed may have been an intermediate intelligent device acting as a point of communication between two separate intelligent devices 110 of the IoT network 120. For example, intelligent device 110b acting as an intermediary between intelligent device 110a and intelligent device 110n. Embodiments of the intelligent device security application 103 may modify the flow of information and data between the intelligent devices 110 of the IoT network 120 to correct for the absence of the intelligent device 110 that was flushed and/or removed from the IoT network 120. One method for curing the gap in the flow of information may be by facilitating a change in the flow of information and data by modifying the flow to include direct communication between the two endpoints of the intelligent device communication. Using the example above, bridging the communication gap between a first intelligent device 110a and the second intelligent device (for example an automobile system 110n), such that intelligent device 110a communicates directly with intelligent device 110n, without having intelligent device 110b operating as an intermediary between the two intelligent devices 110a, 110n.

Alternatively, in some embodiments, the intelligent device security application 103 may cure the gaps in the flow of information and data of the IoT network 120 by recruiting another intelligent device 110 of the IoT network 120 to act in the place of the intelligent device 110 that is being flushed or removed from the IoT network 120. For example, an IoT network 120 for a user's home comprises a plurality of intelligent devices 110, including an automobile, a thermostat, coffee maker and a mobile device. In this example, the automobile predicts when to automatically start remotely for the user's morning commute based on the timing of the user's mobile device checking for travel conditions and whether or not coffee has been brewed and/or dispensed. Subsequently, a gap is formed in the flow of information to the automobile when the coffee maker is flushed and removed from the IoT network 120. If the coffee maker is not replaced or the communication bridge gapped by instead of having the automobile simply rely on the mobile device checking travel conditions as the only signal to engage in remotely starting the automobile, the automobile does not fulfill conditions to start the automobile. Instead of bridging the communication gap to have the mobile device as the sole criteria for starting the automobile, embodiments of the intelligent device security application 103 can modify the flow of information to include a new intelligent device, in this example, the thermostat. The intelligent device security application 103 identifies the presence of the thermostat on the IoT network 120, identifies a correlation between timing of the thermostat temperature being adjusted and the starting of the automobile, indicating that the user adjusts the temperature before leaving the home for the user's commute to the office. Accordingly, in this example, the intelligent device security application 103 bridges the gap left by the removal of the coffee maker by using the adjustment of the thermostat instead of making coffee as part of the events that lead to the signal to the automobile to remotely start the automobile's engine.

Embodiments of the intelligent device security application 103 may comprise a verification module 111. The verification module 111 may perform the functions or tasks responsible for verifying that the removal of data from each of intelligent device 110, IoT network 120 of intelligent devices 110 and/or IoT platform(s) that have communicated with, shared or received data originating from the intelligent device 110 being flushed by the intelligent device management system 101. Embodiments of the verification module 111 may verify whether or not data removal has been successful from each intelligent device 110 or IoT platform 130, by running one or more simulation programs. Embodiments of the simulation programs simulate the operational environment of an intelligent device 110 attempting to communicate with one or more intelligent devices 110 of an IoT network 120 or IoT platform(s) 130. During the simulations, the verification module 111 attempts to test whether the intelligent devices 110, the IoT network 120 and/or the IoT platform(s) are able to recall or use any residual data that may still be stored after the data removal engine 109 performed one or more actions on the data such as removal, deletion or nullification. Embodiments of intelligent devices 110, IoT networks 120 and/or IoT platform(s) 130 still comprising data that was unsuccessfully removed by the data removal engine 109 may operate in the same or similar manner that the intelligent device 110, IoT network 120 or IoT platform(s) 130 would have prior to the data removal engine's 109 attempt to remove the data or perform another action that would have prevented further use of the stored data. Successful removal of data from the intelligent device 110 that was flushed may be indicated by other intelligent devices 110, IoT networks 120 and/or platforms behaving in a manner as if the intelligent device has not communicated with the devices, networks or platforms before (i.e. no recollection of previous communications).

Embodiments of the intelligent security device application 103 may comprise a reporting engine 113. Embodiments of the reporting engine 113 may perform the functions or tasks of the intelligent device security application 103 directed toward report generation operations. More specifically, the reporting engine 113 may generate a report for the user describing the security risks of the intelligent device 110 that was attempted to be flushed. The reporting engine 113 may indicate in the report that the intelligent device 110, IoT network 120 intelligent devices 110 and/or IoT platform(s) 130 have been successfully flushed of any data that may be associated with the intelligent device 110 being serviced by the intelligent device security application 103.

In some embodiments, only some of the intelligent devices 110 or IoT platform(s) 130 that previously communicated with the intelligent device 110 being flushed, may have been successfully flushed by the data removal engine 109. Embodiments of the reporting engine 113 can provide a detailed analysis describing which devices, networks and/or platforms the residual data associated with the intelligent device 110 remain intact. The reporting engine 113 may include a description of the data that was unable to be flushed, allowing for a user to assess the risks of transferring the intelligent device 110 to a new owner or third party and the potential data that may still be discoverable about the user from the partially flushed intelligent device 110. In some embodiments of the reporting engine 113, the flushing operations may be unsuccessful. The reporting engine 113 may generate a report indicating the failure of the flushing operations by the intelligent device security application 103 and may further mark the intelligent device 110 as being a security risk should the user decide to transfer the intelligent device 110 from the current user to a new owner or third party.

Embodiments of the intelligent device security application 103 may further comprise a feedback engine 115. Embodiments of the feedback engine 115 may improve the procedures and instructions disseminated by the IoT knowledge base 140. The feedback engine 115 may track the procedures and steps performed by the intelligent device security application 103 to flush the intelligent device 110 and any secondary intelligent devices and/or IoT platforms 130 maintaining data associated with the intelligent device 110. Upon implementing data removal procedures by the data removal engine 109, verifying the data removal procedures by the verification module 111 and the reporting of the success or failure of the data removal procedures, the feedback engine 115 may report the outcome of the flushing operations to the IoT knowledge base 140, including success or failure of the flushing operations based on the makes and models of intelligent devices 110 accessed during the flushing operations as well as the particular IoT platform(s) 130. Using feedback from the feedback engine 115, the IoT knowledge base 140 may improve upon specific intelligent device 110 and IoT platform 130 procedures for successfully implementing flushing operations as well as further learning which types of intelligent devices 110 and/or IoT platforms may not be flushed successfully or may be more difficult to flush intelligent device data. Subsequent intelligent device management application 103 queries of the IoT knowledge base 140 may be subsequently refined, more accurate and provide an improved recommendation of instructions and procedures for the intelligent device security application 103 to implement in order to successfully flush one or more specific intelligent devices 110, IoT networks 120 and/or IoT platforms 130.

Method for Securely Flushing Data from Intelligent Devices

Figure 4A:
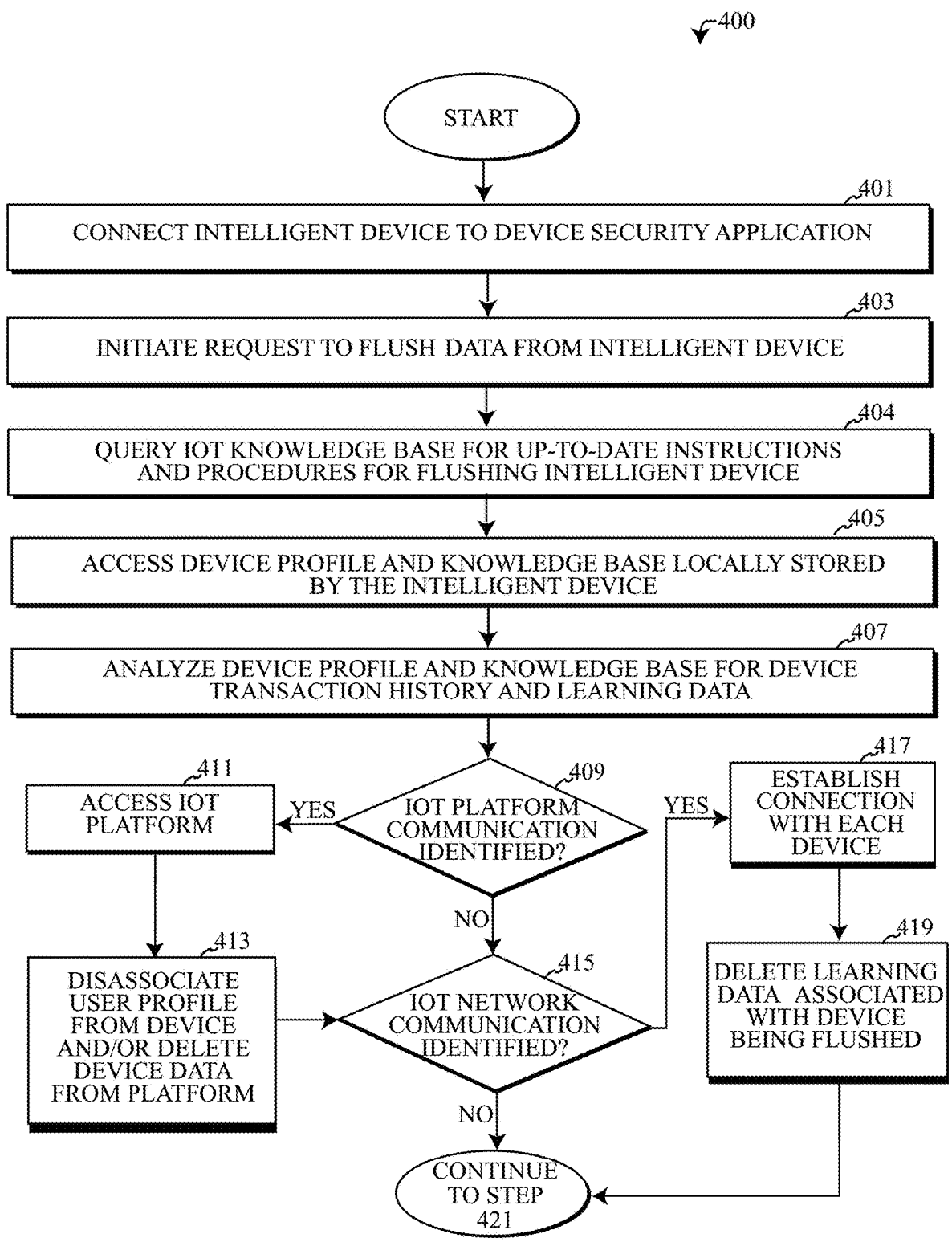
FIG. 4a depicts a flow diagram describing the operational steps of an algorithm implementing an embodiment of a computerized method for securely removing data associated with an intelligent device in accordance with the present disclosure.
Figure 4B:
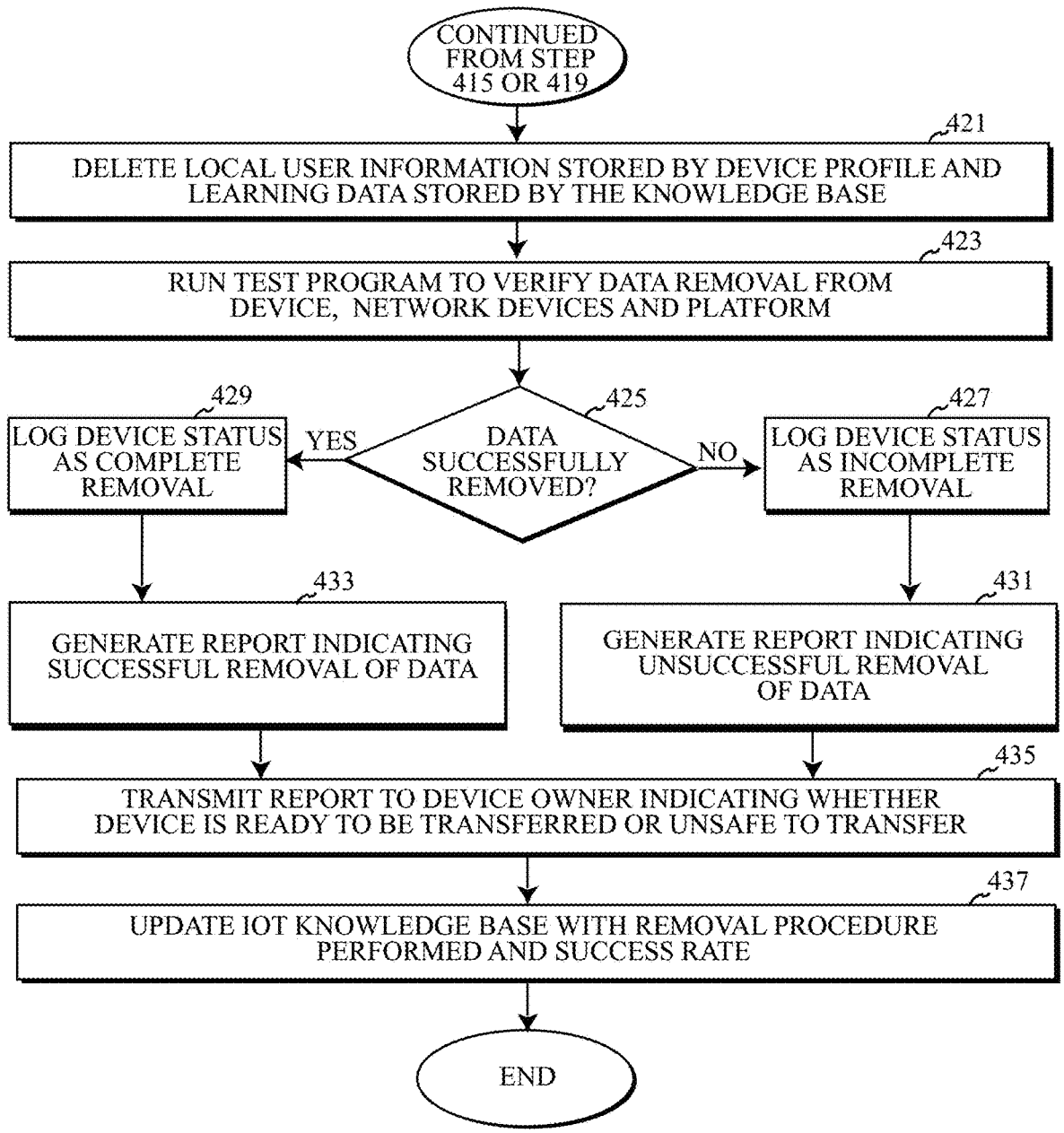

The drawings of FIGS. 4a-4b represent embodiments of an algorithm 400 for securely flushing data from one or more intelligent devices 110 shown and described in FIGS. 1-3 using one or more computer systems as defined generically by computer system 500 of FIG. 5 below and more specifically by the embodiments of specialized computer systems operating in the computer environment 100, 200 depicted in FIGS. 1-3 and as described herein. A person skilled in the art should recognize that the steps of the method described in FIGS. 4a-4b may be performed in a different order than presented and the methods of FIGS. 4a-4b may not require all the steps described herein to be performed. Rather, some embodiments may alter the methods by using one or more of the steps discussed below.

FIG. 4a represents a flowchart illustrating a first portion of an algorithm 400 for flushing data from an intelligent device 110, in accordance with the embodiments of the present disclosure. The embodiment of the method 400 may begin at step 401. At step 401, the intelligent device 110 device the user is seeking to flush the data from, is connected to the intelligent device security application 103 of the intelligent device management system 101 via network 150. Upon connecting the intelligent device 110 to the intelligent device management system 101, the profile module 105 may recognize the intelligent device 110 and/or user associated with the intelligent device 110 and load a profile into the memory 505 of the profile module 105.

At step 403, the intelligent device 110 may initiate a request to flush the data stored locally by intelligent device 110, and/or data that has been shared by the intelligent device 110 with other intelligent devices of an IoT network 120 and/or IoT platforms 130. The request of the intelligent device 110 may specify the types of data to flush and/or describe how different types of shared data should be treated. Users can specify which data is being deleted, wiped or nullified by the data security application 103 and which data, such as profile data is being preserved and/or disassociated with the intelligent device 110 scheduled to be flushed. For example, the intelligent device 110 specifies the deletion of the device profile 112 and learning data stored within the knowledge base 114 of the intelligent device 110, while maintaining the device profile 112 on the IoT platform 130 but requesting the device data manager 131 of the IoT platform 130 disassociate the device profile 112 from the intelligent device 110. By maintaining a device profile as part of the IoT platform 130, the device profile's 112 settings and configurations may be maintained and applied to a subsequent intelligent device 110 that a user may obtain desire to apply the same profile settings or configurations as well as associated learning data, without having to re-train one or more algorithms used by the IoT platform 130.

In some embodiments of algorithm 400, the algorithm 400 may include step 404. During step 404, the analysis engine 107 of the intelligent device security application 103 may search or identify known procedures for flushing data from the intelligent device 110. The known procedures may be obtained from one or more repositories that may be accessible to the intelligence device management system 101. The repositories may maintain information specific to each intelligent device 110, including how to access device profiles 112, user data and learning data stored by the knowledge base 114. For example, the network accessible IoT knowledge base 140 is be populated with the instructions and procedures provided by intelligent device 110 manufacturers, developers, distributors, and/or open source contributors. In the exemplary embodiment of algorithm 400, the analysis engine 107 may query a network accessible IoT knowledge base 140 comprising the known instructions, procedures and methods for flushing data from the specific intelligent device 110 that made the request in step 403, and use the acquired information from the network accessible IoT knowledge base 140 to implement the flushing procedure in accordance with the manufacturers recommendations.

In step 405 of algorithm 400, the intelligent device security application 103 may access the device profile 112 and the knowledge base 114 locally stored by the intelligent device 110. For example, by supplying credentials that allow the intelligent device security application 103 to read and/or write data stored by the intelligent device 110. In the exemplary embodiment, the credentials for accessing the device profile 112 and/or knowledge base 114 may be provided to the intelligent device security application 103 as a result of the query of the IoT knowledge base 140, performed in step 404 or in some embodiments, a user's credentials locally stored by the intelligent device 110 may provide the access to the device profile 112 and the knowledge base 114 when accessed via the intelligent device management system 101. During step 407, the analysis engine 107 may analyze the device profile 112 and knowledge base 114 for a device transaction history, device data, communication logs, user data and learning data stored by the intelligent device. The device transaction histories and communication logs may provide details describing the connection history of the intelligent device 110 and each of the network accessible intelligent devices 110 of an IoT network 120, and/or IoT platforms 130 that have previously connected to the intelligent device 110. The transaction history may include device data and identifying criteria of the devices and platforms that have previously communicated with the intelligent device 110, for example a device name, IP address, MAC address, login credentials, etc.

Based on the analysis of the transaction history and learning data discovered in step 407, the algorithm in step 409 may make a determination whether the intelligent device 110 has communicated with one or more IoT platform(s) 130. If communication with one or more IoT platform(s) 130 has been identified using the transaction history of the intelligent device 110, the algorithm may proceed to step 411 and 413. In step 411, the intelligent device security application 103 may access each IoT platform 130 described by the intelligent device's 110 transaction history obtained in step 407. In step 413, the data removal engine 109 of the intelligent device security application 103 may request removal and/or deletion of any data associated with the user of the intelligence device 110 from the IoT platform 130. Data associated with the user may include user profile data and learning data stored by the IoT platform 130. In some embodiments, instead of deleting user profile data from the IoT platform 130, the data removal engine 109 may disassociate the user profile or learning data from the intelligent device 110, allowing for the users to re-associate the user profile and/or learning data with a second intelligent device 110 at a later date, allowing the IoT platform to retain the information stored about the user without having to re-learn the user's habits and patterns again for the new intelligent device being used.

Conversely, referring back to step 409 of the algorithm 400, if an IoT platform 130 is not identified during the analysis of the data stored by the intelligent device 110 in step 407, the algorithm may proceed to step 415. In step 415, a determination may be made whether or not the analysis engine 107 has identified communications between the intelligent device 110 and one or more network accessible intelligent devices of an IoT network 120. If no communication between the intelligent device 110 and other intelligent devices is identified, the algorithm 400 may proceed to step 421. Alternatively, if one or more network accessible intelligent devices are identified as having previously communicated with the intelligent device 110, the algorithm may proceed to step 417 and 419. In step 417, the intelligent device security application 103 may establish a connection to each intelligent device 110 of the IoT network 120 which has previously connected to the intelligent device 110.

In step 419, once the connection has been established, the data removal engine 109 of the intelligent device security application 103 may delete data associated with the intelligent device 110 from each of the network accessible intelligent devices connect to IoT network 120. The data removal engine 109 may delete learning data and device profiles from each of the networked intelligent devices. For example, by targeting records maintained by the networked intelligent devices which refer to identifying information about the intelligent device 110 being flushed. For instance, the intelligent device's 110 device ID, IP address, MAC address, or any other identifying information that may be used to target records comprising information describing the intelligent device 110. In step 421, may delete, nullify, wipe or remove data describing the user that may be locally stored by the intelligent device 110. For example, one or more device profiles 112, learning data stored by the knowledge base 114, location information, etc.

Embodiments of the intelligent device management system 101, may further test the intelligent device 110, each intelligent device connected to IoT network 120 and the one or more IoT platform(s) 130 that had previously accessed the intelligent device to determine whether or not the data deleted, wiped, removed and/or nullified in steps 413, 419 and 421 successfully removed all of the data linked to the user of the intelligent device 110. In step 423, testing for proper data removal and successful flushing of the data may be performed by the verification module 111. Verification module 111 may run a testing program and/or one or more simulations to verify removal of data from the intelligent device 110, IoT network 120 devices and IoT platform(s) 130. The testing program or simulation may attempt to connect the intelligent device 110 to the IoT network 120, networked intelligent devices 110 and one or more platform(s) 130. The verification module 111 may record the responses and identify whether or not the intelligent device is remembered by the IoT network 120 devices and IoT platform(s) 130. For example, an intelligent device 110 that has to re-authenticate itself and/or connects to a previously communicated with intelligent device 110 or IoT platform 130 wherein the intelligent device is not remembered or is not recognized to be associated with previous learning data may be considered to have been properly wiped, whereas an intelligent device 110 that, whereupon connecting to either the IoT network 120 of devices or IoT platform(s) is immediately treated the same as the intelligent device was treated prior to attempting the flushing of the intelligent device, the intelligent device 110 may not be considered successfully flushed.

Based on the results of the test program and/or intelligent device 110 simulation(s) a determination is made regarding the status of the intelligent device in step 425. The verification module 111 may determine whether or not the data associated with the intelligent device 110 has been successfully deleted, removed, wiped, nullified, etc. If the data has been successfully flushed from the intelligent device 110, the IoT network 120 of devices and/or one or more IoT platforms 130, the algorithm may proceed to step 429. In step 429, the verification module 111 may log the status of the intelligent device 110 as having the associated data successfully flushed. In step 433, the reporting engine 113 may generate a report indicating the successful flushing of the intelligent device 110. The report generated in step 433 may indicate that the intelligent device 110 is ready to be transferred or sold to another user or third party.

Conversely, in step 425, if the data associated with the intelligent device 110 has not been determined by the verification module 111 to be successfully removed, the algorithm 400 may proceed to step 427. In step 427, the verification module 111 may log the intelligent device's 110 status as undergoing an incomplete removal from the intelligent device 110 based on the results of the test program or simulations performed in step 423. Additionally, in some embodiments, the verification module 111 may further pinpoint one or more devices or platforms that the intelligent device management system 101 failed to fully flush the intelligent device data from. In step 427, the reporting engine 113 may generate a report indicating the unsuccessful flushing of the intelligent device 110 data. The report may further indicate which intelligent devices 110 of IoT network 120 or IoT platform(s) 130 are still maintaining data associated with the intelligent device 110 that was attempted to be flushed. Embodiments of the reporting engine 113 may indicate remedial steps a user may take to re-attempt to flush the intelligent device and/or provide a warning to the user that the intelligent device 110 may be a security risk or unsafe to transfer to a second user or third party due to the incomplete flushing of the data.

In step 435, the reporting engine 113 may transmit either the report generated in step 431 or the report generated in step 433 to a user's device and/or the intelligent device 110 for display of the report to the use. The report may be displayed on a human readable display 518 as part of a user interface and inform the user whether the intelligent device 110 has been identified as ready for transfer to a second user/third party, or the intelligent device has been identified as a security risk, if transferred to a user/third party in the current state. In some embodiments of algorithm 400, the feedback engine 115 may provide an update to the network accessible IoT knowledge base 140. The feedback engine 115 may describe the instructions or procedures implemented by the intelligent device management system 101, including a description of the intelligent device 110 as well as the network accessible intelligent devices 110 and/or platform(s) accessed during the flushing processing. The feedback engine 115 may provide the results of the flushing process and indicate whether or not as a result of the flushing processing, the intelligent device 110 successfully flushed data from the intelligent device's 110 local storage system, the IoT network 120 of devices and IoT platform(s). Moreover, if any additional procedures or steps were utilized to obtain a successful flushing of the intelligent device 110 data, the feedback engine 115 may update the records of the network accessible IoT knowledge base 140, in order to further assist future data flushing operation by similar intelligent devices 110.

Computer System

FIG. 5 depicts a block diagram of internal and external components of embodiment of a computer system 500, which may be representative of the one or more computer systems depicted in the computing environment 100, 200 as shown in FIGS. 1-3 in accordance with the embodiments of the present disclosure. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 may include communications fabric 502, which provides for communications between one or more processors 503, memory 505, persistent storage 506, communications unit 511, and one or more input/output (I/O) interfaces 515. Communications fabric 502 can be implemented with any architecture designed for passing data and/or controlling information between processors 503 (such as microprocessors, communications and network processors, etc.), memory 505, external devices 517, and any other hardware components within a system. For example, communications fabric 502 can be implemented with one or more buses.

Memory 505 and persistent storage 506 may be computer-readable storage media. Embodiments of memory 505 may include random access memory (RAM) and cache 507 memory. In general, memory 505 can include any suitable volatile or non-volatile computer-readable storage media. Software, such as a vocational application 103 may be stored in persistent storage 506 for execution and/or access by one or more of the respective processors 503 via one or more devices of memory 505.

Persistent storage 506 may include, for example, a plurality of magnetic hard disk drives. Alternatively, or in addition to magnetic hard disk drives, persistent storage 506 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 506 can also be removable. For example, a removable hard drive can be used for persistent storage 506. Other examples include optical and magnetic disks, thumb drives, and smart cards that are inserted into a drive for transfer onto another computer-readable storage medium that is also part of persistent storage 506.

Communications unit 511 provides for communications with other computer systems or devices via a network (e.g., network 150). In the exemplary embodiment, communications unit 511 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 200 or computer system 500 through communications unit 511 (e.g., via the Internet, a local area network or other wide area network). From communications unit 511, the software and data can be loaded onto persistent storage 506.

One or more I/O interfaces 515 may allow for input and output of data with other devices that may be connected to computer system 500. For example, I/O interface 515 can provide a connection to one or more external devices 517 such as one or more internet-of-things devices, recording device such as an audio system, video systems, one or more sensor device(s), input devices such as a keyboard, computer mouse, touch screen, virtual keyboard, touch pad, pointing device, or other human interface devices. External devices 517 can also include portable computer-readable storage media such as, for example, thumb drives, portable optical or magnetic disks, and memory cards. I/O interface 515 may connect to human-readable display 518.

Human-readable display 518 provides a mechanism to display data to a user and can be, for example, a computer monitor or screen. Human-readable display 518 can integrated into computer systems 500 such as a desktop computer, laptop computer, tablet computer, smartphone, smartwatch, etc. A human-readable display 518 may include a touchscreen which is an input device layered on top of the display for allowing a user to control an electronic device via simple or multi-touch gestures by touching the display with a special stylus and/or one or more fingers. The human-readable display 518 in modern monitors is typically a thin film transistor liquid crystal display (TFT-LCD) or a flat panel LED (light emitting diode) display, while older monitors used cathode ray tubes (CRT). It may be connected to the computer via VGA (video graphics array), DVI (digital video interface), HDMI (High Definition Multi-Media Interface), DisplayPort, Thunderbolt, LVDS (Low-Voltage Differential Signaling) or other proprietary connectors and signals. Originally, computer monitors were used for data processing. From the 1980s onwards, computers (and their monitors) have been used for both data processing and entertainment. The common aspect ratio of computer monitors has changed from "four to three" to "sixteen to nine" resulting in more of a wide-screen display.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
   receiving a request from a user to securely delete data associated with an intelligent device;
   analyzing a device profile and a knowledge base of the intelligent device, the knowledge base comprising a set of learning data;
   identifying, as a function of analyzing the device profile and knowledge base, one or more communications between the intelligent device and one or more network-accessible intelligent devices connected to an internet-of-things (IoT) network;
   establishing a remote connection with the one or more network-accessible intelligent devices identified as having previously communicated with the intelligent device;
   deleting the set of learning data locally stored by the intelligent device and a second set of learning data describing the intelligent device and the user, stored by a second knowledge base of the one or more network-accessible intelligent devices; and
   reporting a successful or failed deletion of the set of learning data and the second set of learning data.

2. The method of claim 1, further comprising the steps of:
   further identifying, as the function of analyzing the device profile and knowledge base, communication between the intelligent device and an IoT platform;
   accessing to the IoT platform; and
   disassociating a user profile stored by the IoT platform from the intelligent device.

3. The method of claim 2, further comprising the step of:
   deleting a third set of learning data stored by the IoT platform describing the intelligent device and the user.

4. The method of claim 3, further comprising the steps of:
   simulating communications between the intelligent device, the one or more network-accessible intelligent devices and the IoT platform;
   verifying deletion of the set of learning data from the intelligent device, the second set of learning data from the one or more network-accessible intelligent devices and the third set of learning data from the IoT platform is complete during the simulated communications;
   generating a report confirming the intelligent device is approved for transferal from the user to a second user.

5. The method of claim 3, further comprising the steps of:
   simulating communications between the intelligent device, the one or more network-accessible intelligent devices and the IoT platform;
   verifying deletion of the set of learning data from the intelligent device, the second set of learning data from the one or more network-accessible intelligent devices and the third set of learning data from the IoT platform is incomplete during the simulated communications;
   marking the intelligent device as a security risk; and
   generating a report describing the security risk associated with transferal of the intelligent device from the user to a second user the intelligent device.

6. The method of claim 2, further comprising the steps of:
   querying a network-accessible IoT knowledge base; and
   retrieving from the network-accessible IoT knowledge base, program instructions for securely deleting data associated with the intelligent device from the IoT platform and the one or more network-accessible intelligent devices.

7. The method of claim 6, further comprising the step of:
   updating one or more records of the network-accessible IoT knowledge base describing procedures implemented for securely deleting data associated with the intelligent device and an indication of success or failure implementing the procedures.

8. A computer system comprising:
   one or more processors; and
   a computer-readable storage media coupled to the one or more processors, wherein the computer-readable storage media contains program instructions executing a computer-implemented method comprising the steps of:
   receiving a request from a user to securely delete data associated with an intelligent device;
   analyzing a device profile and a knowledge base of the intelligent device, the knowledge base comprising a set of learning data;
   identifying, as a function of analyzing the device profile and knowledge base, one or more communications between the intelligent device and one or more network-accessible intelligent devices connected to an internet-of-things (IoT) network;
   establishing a remote connection with the one or more network-accessible intelligent devices identified as having previously communicated with the intelligent device;
   deleting the set of learning data locally stored by the intelligent device and a second set of learning data describing the intelligent device and the user, stored by a second knowledge base of the one or more network-accessible intelligent devices; and
   reporting a successful or failed deletion of the set of learning data and the second set of learning data.

9. The computer system of claim 8, further comprising:
   further identifying, as the function of analyzing the device profile and knowledge base, communication between the intelligent device and an IoT platform;
   accessing to the IoT platform; and
   disassociating a user profile stored by the IoT platform from the intelligent device.

10. The computer system of claim 9, further comprising:
    deleting a third set of learning data stored by the IoT platform describing the intelligent device and the user.

11. The computer system of claim 10, further comprising:
    simulating communications between the intelligent device, the one or more network-accessible intelligent devices and the IoT platform;
    verifying deletion of the set of learning data from the intelligent device, the second set of learning data from the one or more network-accessible intelligent devices and third set of learning data from the IoT platform is complete during the simulated communications;
    generating a report confirming the intelligent device is approved for transferal from the user to a second user.

12. The computer system of claim 10, further comprising:
    simulating communications between the intelligent device, one or more of the network-accessible intelligent devices and the IoT platform;
    verifying deletion of the set of learning data from the intelligent device, the second set of learning data from the one or more network-accessible intelligent devices and third set of learning data from the IoT platform is incomplete during the simulated communications;
    marking the intelligent device as a security risk; and
    generating a report describing the security risk associated with transferal of the intelligent device from the user to a second user the intelligent device.

13. The computer system of claim 9, further comprising:
querying a network-accessible IoT knowledge base; and
retrieving from the network-accessible IoT knowledge base, program instructions for securely deleting data associated with the intelligent device from the IoT platform and the one or more network-accessible intelligent devices.

14. The computer system of claim 13, further comprising:
updating one or more records of the network-accessible IoT knowledge base describing procedures implemented for securely deleting data associated with the intelligent device and an indication of success or failure implementing the procedures.

15. A computer program product comprising:
one or more computer readable storage media having computer-readable program instructions stored on the one or more computer-readable storage media, said program instructions executes a computer-implemented method comprising the steps of:
receiving a request from a user to securely delete data associated with an intelligent device;
analyzing a device profile and a knowledge base of the intelligent device, the knowledge base comprising a set of learning data;
identifying, as a function of analyzing the device profile and knowledge base, one or more communications between the intelligent device and one or more network-accessible intelligent devices connected to an internet-of-things (IoT) network;
establishing a remote connection with the one or more network-accessible intelligent devices identified as having previously communicated with the intelligent device;
deleting the set of learning data locally stored by the intelligent device and a second set of learning data describing the intelligent device and the user, stored by a second knowledge base of the one or more network-accessible intelligent devices; and
reporting a successful or failed deletion of the set of learning data and the second set of learning data.

16. The computer program product of claim 15, further comprising:
further identifying, as the function of analyzing the device profile and knowledge base, communication between the intelligent device and an IoT platform;
accessing to the IoT platform; and
disassociating a user profile stored by the IoT platform from the intelligent device.

17. The computer program product of claim 16, further comprising:
deleting a third set of learning data stored by the IoT platform describing the intelligent device and the user.

18. The computer program product of claim 17, further comprising:
simulating communications between the intelligent device, the one or more network-accessible intelligent devices and the IoT platform;
verifying deletion of the set of learning data from the intelligent device, the second set of learning data from the one or more network-accessible intelligent devices and third set of learning data from the IoT platform is complete during the simulated communications; and
generating a report confirming the intelligent device is approved for transferal from the user to a second user.

19. The computer program product of claim 17 further comprising:
simulating communications between the intelligent device, the network-accessible intelligent device and the IoT platform;
verifying deletion of the set of learning data from the intelligent device, the second set of learning data from the one or more network-accessible intelligent devices and third set of learning data from the IoT platform is incomplete during the simulated communications;
marking the intelligent device as a security risk; and
generating a report describing the security risk associated with transferal of the intelligent device from the user to a second user the intelligent device.

20. The computer program product of claim 16 further comprising:
querying a network-accessible IoT knowledge base; and
retrieving from the network-accessible IoT knowledge base, program instructions for securely deleting data associated with the intelligent device from the IoT platform and the one or more network-accessible intelligent devices.

* * * * *